United States Patent [19]

Hilgendorf

[11] Patent Number: 5,317,696

[45] Date of Patent: May 31, 1994

[54] BUS ARBITRATION SCHEME

[75] Inventor: Rolf B. Hilgendorf, Boeblingen, Fed. Rep. of Germany

[73] Assignee: International Business Machines Corporation, Armonk, N.Y.

[21] Appl. No.: 721,749

[22] Filed: Jun. 26, 1991

[30] Foreign Application Priority Data

Jul. 3, 1990 [EP] European Pat. Off. ........ 90112661.5

[51] Int. Cl.$^5$ .............................................. G06F 13/36
[52] U.S. Cl. .................................... 395/325; 395/725; 364/242.92; 364/240.5; 364/242.7; 364/242.8; 364/DIG. 1; 364/937.01; 364/DIG. 2
[58] Field of Search ....................... 395/725, 325, 275; 364/242.92, DIG. 1, 937.01, DIG. 2, 240.5, 242.7, 242.8

[56] References Cited

U.S. PATENT DOCUMENTS

| | | | |
|---|---|---|---|
| 3,300,758 | 1/1967 | Hawley, Jr. | 340/147 |
| 3,311,881 | 3/1967 | Mellott | 340/147 |
| 3,919,692 | 11/1975 | Kronies et al. | 340/172.5 |
| 4,016,539 | 4/1977 | Nanya | 340/147 |
| 4,090,238 | 5/1978 | Russo | 364/200 |
| 4,121,285 | 10/1978 | Chen | 364/200 |
| 4,148,011 | 4/1979 | McLagan | 340/147 |
| 4,189,766 | 2/1980 | Horiguchi | 364/200 |
| 4,237,534 | 12/1980 | Felix | 364/200 |
| 4,249,093 | 2/1981 | Henig | 307/232 |
| 4,270,167 | 5/1981 | Koehler et al. | 364/200 |
| 4,275,458 | 6/1981 | Khera | 364/900 |
| 4,281,381 | 7/1981 | Ahuja et al. | 364/200 |
| 4,302,808 | 11/1981 | Zanchi | 364/200 |
| 4,314,164 | 2/1982 | Tin et al. | 307/243 |
| 4,314,335 | 2/1982 | Pezzi | 364/200 |
| 4,319,222 | 3/1982 | Davis et al. | 340/825.5 |
| 4,332,011 | 5/1982 | Epstein et al. | 364/200 |
| 4,334,288 | 6/1982 | Booher | 364/900 |
| 4,339,808 | 7/1982 | North | 364/900 |
| 4,348,741 | 9/1982 | McAlister | 364/900 |
| 4,366,480 | 12/1982 | VanHatten | 340/825.51 |
| 4,384,323 | 5/1983 | Ahuja | 364/200 |
| 4,398,105 | 8/1983 | Keller | 307/518 |
| 4,417,303 | 11/1983 | Korowitz et al. | 364/200 |
| 4,423,384 | 12/1983 | DeBock | 328/152 |
| 4,437,158 | 3/1984 | Alfke et al. | 364/200 |
| 4,467,411 | 8/1984 | Fry et al. | 364/200 |
| 4,472,712 | 9/1984 | Ault et al. | 340/825.5 |
| 4,493,036 | 1/1985 | Boudreau et al. | 364/200 |
| 4,514,728 | 4/1985 | Ahuja | 340/825.5 |
| 4,554,628 | 11/1985 | Bell | 364/200 |
| 4,583,160 | 4/1986 | Iguma | 364/200 |

(List continued on next page.)

FOREIGN PATENT DOCUMENTS 0130470 1/1985 European Pat. Off. ..... G06F 13/36

OTHER PUBLICATIONS

IBM TDB vol. 30, No. 8, Jan. 1988, N. Ohba, "Priority Controller For Bus Arbiter" pp. 367–369.
IBM TDB vol. 31, No. 2, Jul. 1988, E. W. Miller, "FIFO Arbitrator" pp. 47–51.
IBM TDB vol. 32, No. 5A, Oct. 1989, R. N. Bailey et al., "Two-Level Internal Bus Arbitration For The System IO Bus", pp. 225–228.
Electronic Design, vol. 36, No. 9, 14th Apr. 1988, pp. 107–110,112; N. Siddique et al.: "Metastable-free Arbitrator Coordinates Processors".

Primary Examiner—Michael R. Fleming
Assistant Examiner—Glenn A. Auve
Attorney, Agent, or Firm—Arthur J. Samodovitz

[57] ABSTRACT

A bus arbitration scheme for controlling access or mastership of a bus is disclosed. Priority of access to the bus is based not only on the time relationship of the requests for use of the bus arriving at the arbiter but also on the relative priority of each request. Thus a higher priority request will gain access to the bus before a lower priority one even if this latter request arrived at the arbiter first. The arbitration scheme is implemented by a series of logic gates.

12 Claims, 4 Drawing Sheets

U.S. PATENT DOCUMENTS

| | | | |
|---|---|---|---|
| 4,594,590 | 6/1986 | VanHatten | 340/825.51 |
| 4,597,054 | 6/1986 | Lockwood et al. | 364/900 |
| 4,600,992 | 7/1986 | Boudreau et al. | 364/200 |
| 4,602,327 | 7/1986 | LaViolette et al. | 364/200 |
| 4,611,297 | 9/1986 | Dudley et al. | 364/900 |
| 4,612,542 | 9/1986 | Pantry et al. | 340/825.5 |
| 4,620,118 | 10/1986 | Barber | 307/518 |
| 4,620,278 | 10/1986 | Ellsworth et al. | 364/200 |
| 4,633,392 | 12/1986 | Vincent et al. | 364/200 |
| 4,639,859 | 1/1987 | Ott | 364/200 |
| 4,641,266 | 2/1987 | Walsh | 364/200 |
| 4,660,169 | 4/1987 | Norgren et al. | 364/900 |
| 4,727,479 | 2/1988 | Kirrmann | 364/200 |
| 4,734,882 | 3/1988 | Romagosa | 364/900 |
| 4,815,039 | 3/1989 | Tai et al. | 365/189 |
| 4,818,985 | 4/1989 | Ikeda | 340/825.5 |
| 4,839,886 | 6/1989 | Wu et al. | 370/4 |
| 4,851,996 | 7/1989 | Boioli et al. | 364/200 |
| 4,882,580 | 11/1989 | Teranishi et al. | 340/825.51 |
| 4,894,565 | 1/1990 | Marquardt | 307/518 |
| 4,924,220 | 5/1990 | Mihara et al. | 340/825.510 |
| 4,926,313 | 5/1990 | Byers | 364/200 |
| 5,032,984 | 7/1991 | Byers et al. | 395/425 |

BUS ARBITRATION SCHEME

DESCRIPTION

1. Field of the Invention

Computer systems contain bus structures in which several different devices compete for the mastership of the bus. Such devices would include signal processors, mass memories and input/output controllers. An arbitration scheme is generally incorporated into the design of the bus to decide which device can access the bus at any particular time. Depending on the arbitration strategy adopted, a considerable number of requests for the use of the bus may be delayed because other devices continually have prior mastership of the bus. This is not always acceptable and this invention relates to ways of avoiding such a situation occurring.

2. Prior Art

Several different arbitration schemes are used in a miniprocessor or microprocessor environment. They are mostly based on priorities and differ in the way in which these priorities are assigned and utilized.

The most basic arbitration scheme is the so-called FIFO (First-In-First-Out) Arbitrator similar to that described in "FIFO Arbitrator", IBM Technical Disclosure Bulletin, vol 31(2), July 1988, pp 47-51. In this scheme requests to access a memory port interface through a bus are treated strictly in the order in which they arrive. This scheme has the disadvantage in that no account is taken of the relative importance of each of the access requests. Thus any device urgently requiring access to the memory may have to wait whilst other lower-priority devices complete their operations.

A commonly used prior art method for bus arbitration which overcomes the above disadvantage involves the use of a central arbiter to communicate with all the devices desiring to use the bus. The central arbiter determines which device has the highest bus use priority taking into account how important the device is and how long the device has been requesting the use of the bus. It then sends out a signal permitting the device to use the bus. This whole processing system will fail should the central arbiter cease to function.

A third prior art system has been referred to as 'daisy chaining' and is disclosed in more detail in European Patent Application EP-A-0 130 470 (IBM). In this method a signal indicating that the bus is available for use is transmitted from device to device in priority order. Any device therefore requiring access captures the signal and as a result may use the bus. This system fails to overcome the problem that low priority devices may have to wait an exorbitant length of time until they are granted access to the bus.

"Two-level internal bus arbitration for the system IO bus", IBM Technical Disclosure Bulletin, vol 32 (5A), October 1989, pp 225-228, teaches a fourth prior art system in which a fixed priority scheme is used to determine the arbitration. All requests received whilst a bus is mastered by another device are latched by common logic and will be processed in priority order when the bus next becomes free. Again this prior art fails to solve the problem that may occur when one low priority device is unable to access the bus since other higher-priority devices are granted continually mastership of the bus.

A rotating priority scheme such as that described in "Priority Controller for bus arbiter" IBM Technical Disclosure Bulletin, vol 30 (8), January 1988, pp 367-369 (a fifth prior art system), offers bus access to each device in strict rotation. While this overcomes the problems of some bus access requests being delayed for too long, it again fails to take into account the need for some devices to access the bus prior to others.

SUMMARY OF THE INVENTION

The invention overcomes these difficulties by grouping devices of similar priority together. At each priority level, requests for bus access are treated in the order at which they are generated. This arbitration scheme allows one to take into account the different timing relationship of each request and ensure that, at least within similar priority levels, no bus access request is unduly delayed. The apparatus to operate this request uses simple logic gates and hence does not require the use of a central arbiter.

DETAILED DESCRIPTION OF THE INVENTION

Figure 1:
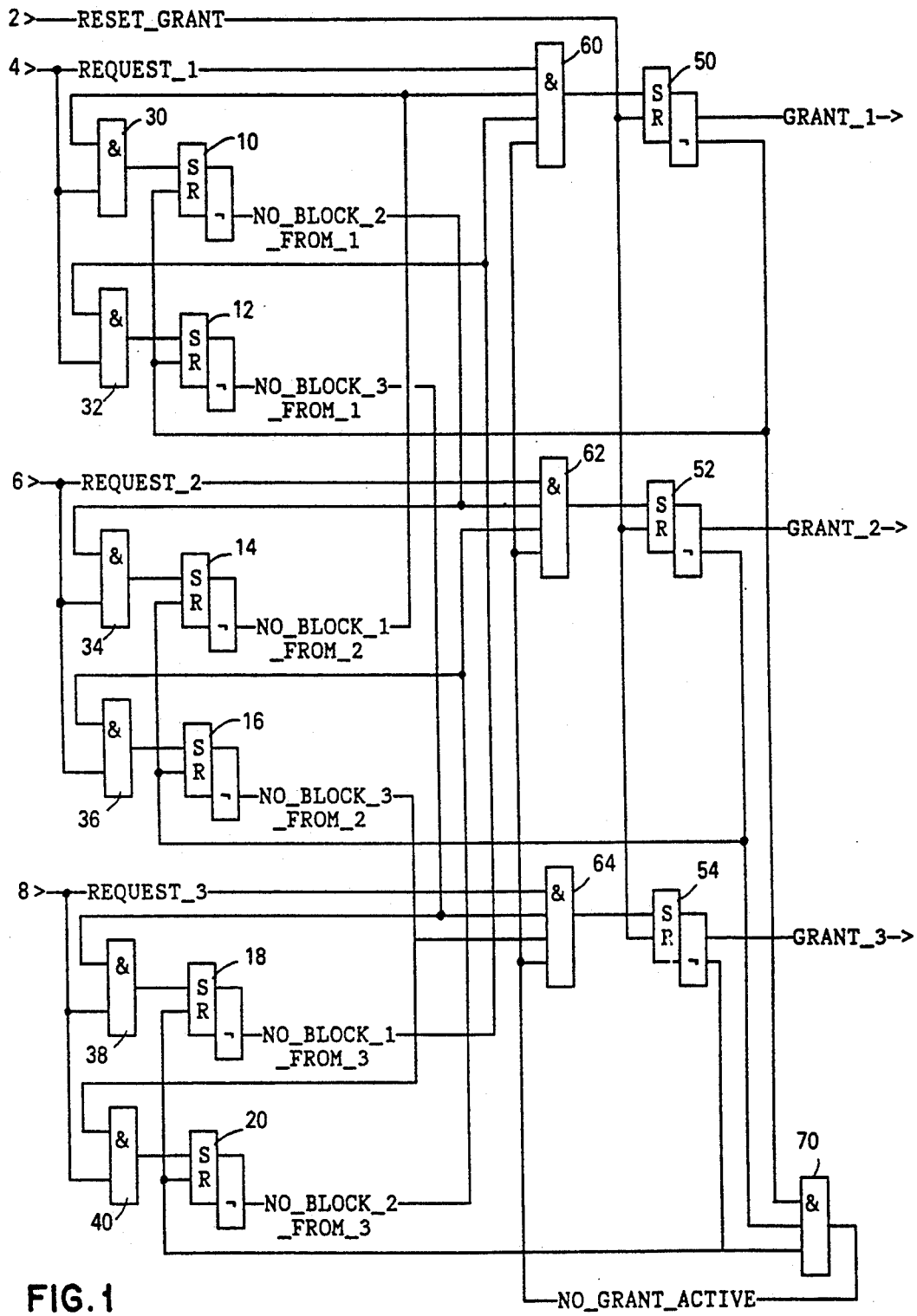
FIG. 1 shows the basic implementation of the request-time dependant arbiter.

FIG. 1 shows the basic implementation of the arbiter. It consists of a series of block latches 10, 12, 14, 16, 18 and 20 and a series of grant latches 50, 52 and 54 both of which are formed of set/reset flip-flops. The inputs to set the grant latches 50, 52, 54 are obtained from AND gates 60, 62, 64. The inputs to set the block latches 10, 12, 14, 16, 18 and 20 are obtained from AND gates 30, 32, 34, 36, 38 and 40.

The operation of the circuit can be considered in detail if we assume that the system has three devices each wishing to access the bus. Each device 1, 2 or 3 will issue a request for access at a different time along lines 4, 6 or 8. Let us suppose that the requests occur in the following order REQUEST_3 on line 8 followed by REQUEST_1 on line 4 and then REQUEST_2 on line 6.

The REQUEST-_3 will be granted by grant latch 54. Since at the beginning of the sequence no requests for access were present, the NO_GRANT_ACTIVE signal from grant active AND gate 70 is high, the NO_BLOCK_3_FROM_1 signal issued from block latch 12 is high and the NO_BLOCK_3_FROM 2 from block latch 16 is also high. Hence AND gate 64 sets grant latch 54 to allow device 3 issuing REQUEST_3 to be immediately granted mastership of the bus. The AND gates 38 and 40 cause the block latches 18 and 20 to set respectively the NO_BLOCK_1_FROM_3 and NO_BLOCK_2_FROM_3 low and thus grant latches 50 and 52 will not be able to grant access to the bus.

When REQUEST_1 (the second in the sequence of the example) is received on line 4, device 1 is not granted access to the bus since the low signal being issued on NO_BLOCK_1_FROM_3 from block latch 18 means that AND gate 60 cannot set grant latch 50. However the REQUEST_1 signal is passed to AND gate 30 to cause a low NO_BLOCK_2_

FROM_1 signal to be issue from block latch 10 which will block future access to the bus by device 2. The REQUEST_2 signal (the last in the sequence of the example) when it is received cannot block either of the other two devices' access to the bus and thus takes the lowest priority for bus access.

After REQUEST_3 has been granted, an inverted output from grant latch 54 resets blocking latches 18 and 20 which set NO_BLOCK_1_FROM_3 and NO_BLOCK_2_FROM_3 high again. This allows AND gate 60 to pass REQUEST_1 to grant latch 50 and device 1 will be granted bus access when current bus use is completed (indicated by NO_GRANT_ACTIVE from AND gate 70 becoming high). Note that REQUEST_2 is still blocked by a low NO_BLOCK_2_FROM_1 signal from block latch 10. Future attempts by device 3 to access the bus will be blocked until REQUEST_1 and REQUEST_2 are both granted as low NO_BLOCK_3_FROM_1 and NO_BLOCK_3_FROM_2 signals are sent from block latches 12 and 16.

Figure 2:
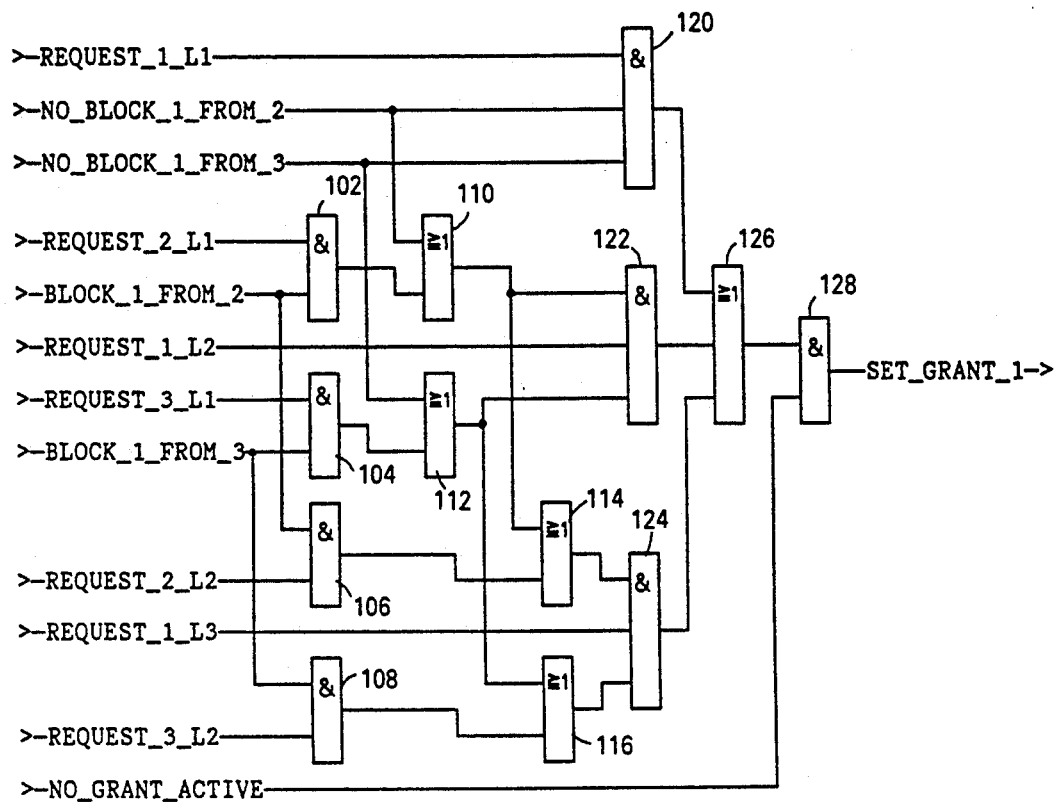
FIG. 2 shows the grant latch of the arbiter designed to handle three priority levels.

The arbitration scheme can be extended to different priority levels for each request line 4, 6 or 8. If we denote the signal notation L1 to be the lowest priority and L3 to be the highest priority then the AND gate 60 will be replaced by the circuit shown in FIG. 2. The effect of this circuit is to determine the relative priority of REQUEST_1 compared to REQUEST_2 and REQUEST_3 and, if necessary override previous access requests. Obviously, if neither device 2 nor device 3 are requesting mastership of the bus then no question of access priority will arise. In this case REQUEST_1_L1, REQUEST_1_L2 or REQUEST_1_L3 will be passed directly to AND gates 120, 122 or 124 respectively and then to OR gate 126. AND gate 128 will pass a signal to grant latch 50 of FIG. 1 to ensure that device 1 is granted bus access when current bus use is completed (indicated by NO_GRANT_ACTIVE becoming high). If on the other hand, REQUEST_2 and/or REQUEST_3 signals are pending (and hence blocking immediate access to the bus by REQUEST_1), then the circuit must check their relative priorities. If REQUEST_1 has priority L2, then in AND gates 102 and 104 and OR gates 110 and 112 a comparison is made to see whether REQUEST_2 and/or REQUEST_3 have lower priority L1. If this is the case, then REQUEST_1_L2 is passed to AND gate 122 and hence to OR gate 126 to allow AND gate 128 to set grant latch 50 to grant bus mastership to device 1 when the bus becomes free. The other REQUEST signals are still held, but do not receive access to the bus at this stage. If REQUEST_2 or REQUEST_3 have the same priority as REQUEST_1 then the circuit does not alter the order in which bus access is granted. The rest of the circuit shown in FIG. 2 determines, if REQUEST_1 has the highest priority L3, whether REQUEST_2 and/or REQUEST_3 have the same or lower priority and thus prescribes in a similar manner to that already described the order of access to the bus. The operation of this part of the circuit for the case in which a REQUEST signal may have one of three priority levels has only been described for the replacement of AND gate 60. It is clear that AND gates 62 and 64 will also have to be replaced with similar circuits, the operation of which will be the same.

Figure 3:
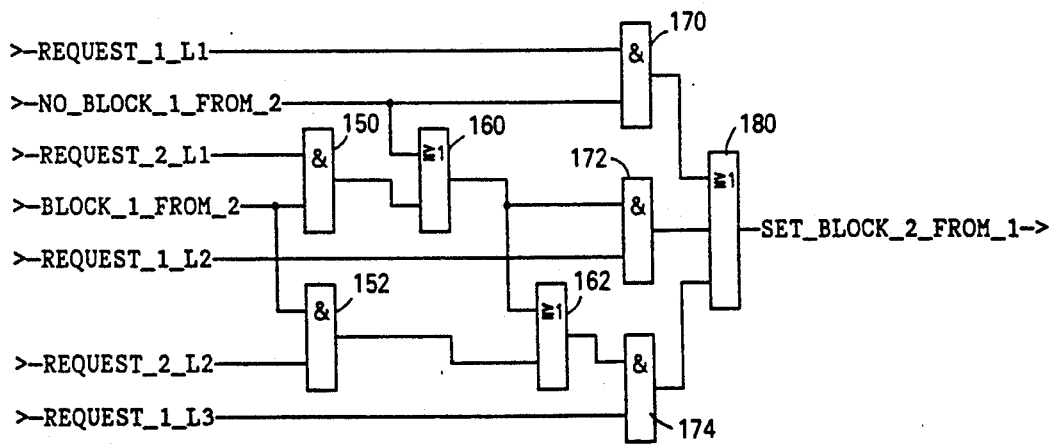
FIG. 3 shows the block latch of the arbiter designed to handle three priority levels.

Extension of the arbitration scheme to different priority levels involves also the replacement of the AND gates 30, 32, 34, 36, 38 and 40 with a circuit similar to that shown in FIG. 3. The function of this circuit will be described by taking AND gate 30 as an example. If REQUEST_1 has the lowest priority L1 then the circuit described will block device 2 only if NO_BLOCK_1_FROM_2 is high. This is achieved using the AND gate 170 and OR gate 180 to set block latch 10. If, however, REQUEST_1 has a higher priority L2, then REQUEST_2 can only be blocked (or continue to be blocked) if it has a lower priority L1. This is achieved by comparing REQUEST_2_L1 and REQUEST_1_L2 in AND gate 172. Similarly OR gate 162 and AND gate 174 allow the circuit to check whether, if REQUEST_1 has priority L3, REQUEST_2 has a priority L2 or L1 in which case REQUEST_2 will continue to be blocked. If REQUEST_2 has the same or higher priority than REQUEST_1 then the block latch 10 will not block REQUEST_2 to prevent device 2 from gaining access to the bus before device 1.

Figure 4:
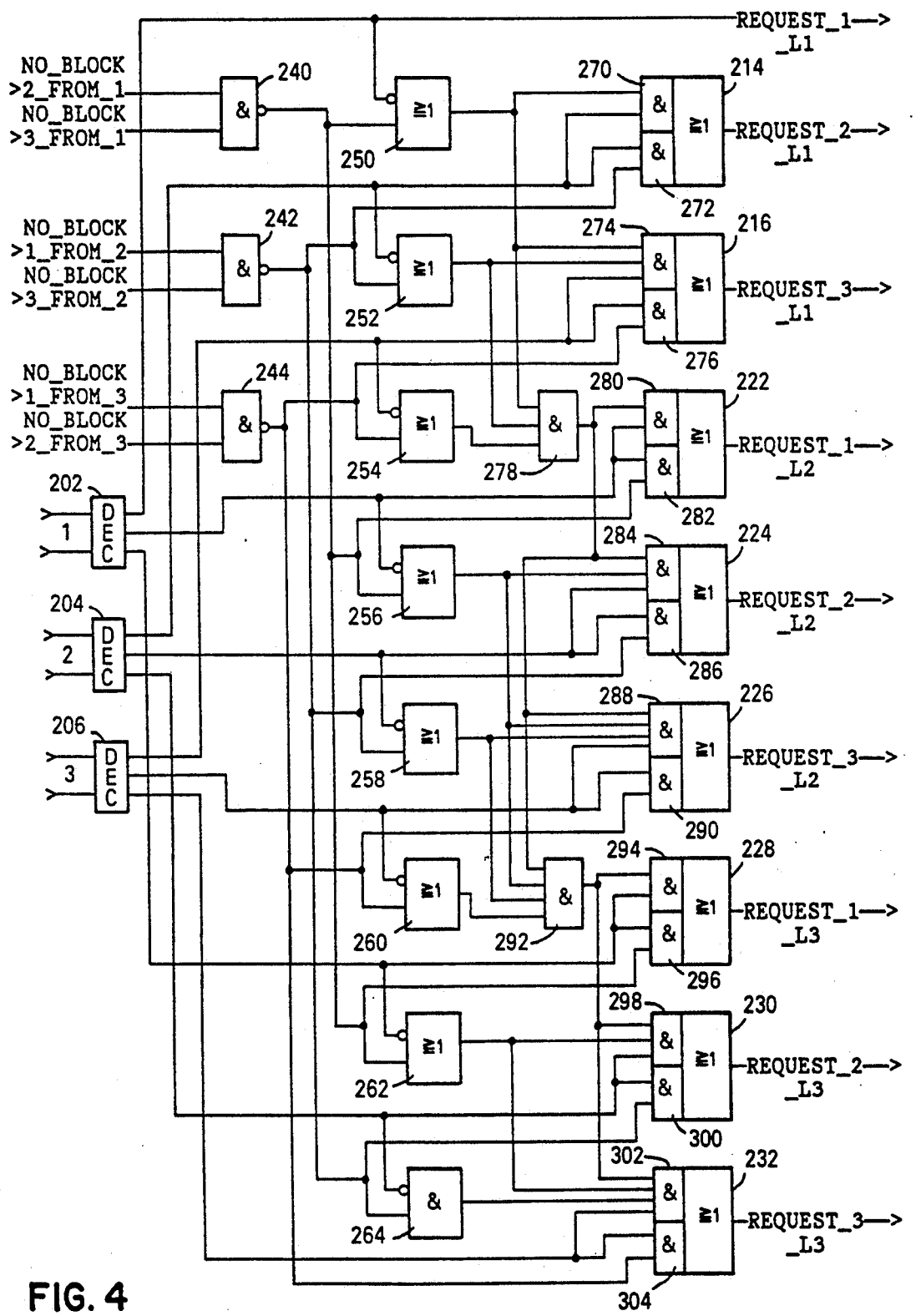
FIGS. 4 and 5 show the decoding units to determine the priority level of each request.
Figure 5:
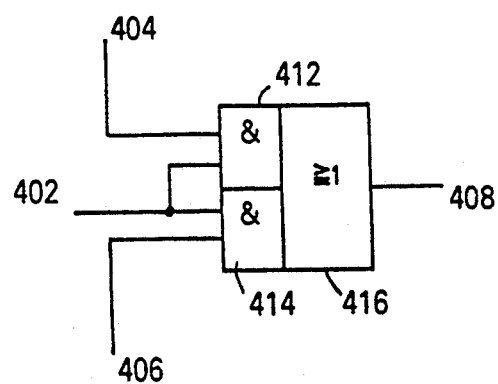

If two requests for mastership of the bus arrive at exactly the same time (or in the same time slot), then means must be provided to resolve this problem. This is achieved using the circuit shown in FIG. 4. This circuit can be broken down into the simpler units shown in FIG. 5 by considering each of the outputs of the circuit of FIG. 4 to consist of two AND gates and an OR gate. This basic output is illustrated in FIG. 5 as two AND gates 412 (corresponding to AND gates 270, 274, 280, 284, 288, 294, 298 and 302 of FIG. 4) and 414 (corresponding to AND gates 272, 276, 282, 286, 290, 296, 300 and 304 of FIG. 4) and an OR gate 416 (corresponding to OR gates 214, 216, 222, 224, 226, 228, 230 and 232 of FIG. 4). A REQUEST is passed to both AND gates 412 and 414 along line 402. If there is no higher priority request or if the higher priority request has already been blocked, then line 404 will be high and the REQUEST will be passed by the AND gate 412 to the OR gate 416. If the block latch for this REQUEST has already been set by another REQUEST, then line 406 will be high and the request passed through AND gate 414 to OR gate 416. In all other cases, the REQUEST will remain pending on line 402 until one of the above cases has been reached and either line 404 or line 406 become high. It should be noted that some of the AND gates of FIG. 4 (i.e. 274, 284, 288, 298 and 302) corresponding to AND gate 412 of FIG. 5 have more than two inputs. In this case line 404 of FIG. 5 can be taken to represent all the input lines to the AND gates of FIG. 4 except that line coming directly from the decoders 202, 204, 206. The REQUEST signals will only be passed when all of the input lines are high. The rest of the logic shown in FIG. 4 serves to determine which block latches 10, 12, 14, 16, 18 and 20 have already been set and which higher priority requests are pending.

Although the invention has been described in terms of three requestors and three priority levels, it will be obvious to a man skilled in the art that the principle and circuitry could be extended to include further requestors as well as more priority levels.

I claim:

1. Apparatus for arbitrating requests from at least three devices for access to a common bus, said apparatus comprising:

first, second and third grant latch and gate means, each coupled to receive a bus access request from a respective one of said devices, for presenting one of the bus access requests at a time to a bus controller to grant bus access to the device making said one request; and first, second and third pluralities of block latch and gate means, each of said pluralities having inputs coupled to receive a bus access request from a respective one of said devices and block and no block signals from the other two pluralities of block latch and gate means, having outputs coupled to inputs of the two grant latch and gate means coupled to the other two devices, and issuing block and no block signals to said two grant latch and gate means, said block signal blocking other subsequent, copending bus access requests by the devices coupled to said two grant latch and gate means, said outputs also being coupled to the inputs of said other two pluralities of block latch and gate means to supply said block and no block signals, said block signal input to either one of said other two pluralities of block latch and gate means preventing said one plurality of block latch and gate means from issuing a block signal to the grant latch and gate means coupled to a same device as the block latch and gate means which provides said block signal input.

2. Apparatus of claim 1 further comprising:
bus access request favoring means for favoring one bus access request when more than one bus access request with a same priority arrive at the same time or in the same clock cycle.

3. Apparatus of claim 1 wherein:
said bus access request favoring means comprises means for determining which of said bus access requests has caused one of said block latch and gate means to issue a block signal and, as a result, to favor another of the bus access requests.

4. Apparatus of claim 1 further comprising means for sequencing bus access based on a bus access priority level of each of said devices.

5. Apparatus of claim 4 wherein the sequencing means and said plurality of block latch and gate means sequence bus access for bus requests having the same bus access priority level, based on the temporal order in which said bus access requests are made.

6. Apparatus of claim 5 wherein the sequencing means sequences bus access such that priority level takes precedence over the temporal order at which bus requests are made.

7. Apparatus of claim 4 wherein the sequencing means sequences bus access such that priority level takes precedence over the temporal order at which bus access requests are made.

8. Apparatus as set forth in claim 1 wherein each of the grant latch and gate means comprises a grant latch and an AND gate, said AND gate having a first input coupled to receive the bus request from the coupled device, second and third inputs coupled to receive block and no block signals from the two block latch and gate means coupled to the other devices, and an output coupled to an input of said grant latch, said grant latch having an output which presents a bus access request to the bus controller.

9. Apparatus as set forth in claim 8 further comprising a grant active AND gate having inputs coupled to outputs of all of said grant latches to indicate whether any bus access request is pending, and an output coupled to an input of each of said AND gates of said first, second and third grant latch and gate means, whereby when no bus access request is output from any of said grant latch and gate means a logic one level is input to each of said AND gates of said first, second and third grant latch and gate means to enable passage of a bus access request from the coupled device to the grant latch and when a bus access request is output from any of said grant latch and gate means a logic zero level is input to each of said AND gates of said first, second and third grant latch and gate means to prevent passage of a bus access request from the coupled device to the grant latch.

10. Apparatus as set forth in claim 1 wherein each of said pluralities of block latch and gate means comprises first and second AND gates and first and second block latches, outputs of said first and second AND gates being supplied to inputs of said first and second block latches, respectively, one input of each of said first and second AND gates being supplied by the bus access request of the coupled device, another input of said first AND gate being supplied by an output of a block latch of another block latch and gate means and another input of said second AND gate being supplied by an output of a block latch of yet another block latch and gate means.

11. Apparatus as set forth in claim 1 further comprising means for overriding a block signal originating from one of said block latch and gate means coupled to one of said devices and applied to the grant latch and gate means coupled to another of said devices with a subsequent bus access request from said other device if said other device has a higher priority than said one device.

12. Apparatus of claim 11 wherein:
said bus access requests can have three or more levels of priority.

* * * * *